US010030564B2

(12) United States Patent
Cossard et al.

(10) Patent No.: US 10,030,564 B2
(45) Date of Patent: Jul. 24, 2018

(54) DEVICE FOR PURIFYING THE EXHAUST GAS OF AN INTERNAL COMBUSTION ENGINE

(71) Applicant: Faurecia Systemes D'Echappement, Nanterre (FR)

(72) Inventors: Sebastien Cossard, Belleville (FR); Frederic Guilbaud, Montbeliard (FR)

(73) Assignee: Faurecia Systemes D'Echappement (FR)

( * ) Notice: Subject to any disclaimer, the term of this patent is extended or adjusted under 35 U.S.C. 154(b) by 236 days.

(21) Appl. No.: 14/912,675

(22) PCT Filed: Aug. 29, 2014

(86) PCT No.: PCT/EP2014/068449
§ 371 (c)(1),
(2) Date: Jun. 21, 2016

(87) PCT Pub. No.: WO2015/028647
PCT Pub. Date: Mar. 5, 2015

(65) Prior Publication Data
US 2016/0298517 A1    Oct. 13, 2016

(30) Foreign Application Priority Data

Aug. 30, 2013 (FR) .................................. 13 588347

(51) Int. Cl.
*F01N 3/28* (2006.01)
*F01N 3/20* (2006.01)
*B01D 53/94* (2006.01)

(52) U.S. Cl.
CPC ....... *F01N 3/2892* (2013.01); *B01D 53/9431* (2013.01); *B01D 53/9477* (2013.01); *F01N 3/206* (2013.01); *F01N 3/2066* (2013.01); *B01D 2251/2067* (2013.01); *B01D 2255/904* (2013.01); *B01D 2255/9155* (2013.01); *B01D 2258/012* (2013.01); *B01D 2259/124* (2013.01); *F01N 2240/20* (2013.01); *F01N 2610/02* (2013.01); *F01N 2610/1453* (2013.01); *Y02T 10/24* (2013.01)

(58) Field of Classification Search
None
See application file for complete search history.

(56) References Cited

U.S. PATENT DOCUMENTS

| 2009/0019843 A1 | 1/2009 | Levin | |
|---|---|---|---|
| 2010/0005790 A1* | 1/2010 | Zhang | F01N 3/36 60/301 |
| 2012/0216513 A1* | 8/2012 | Greber | F01N 3/2066 60/295 |

FOREIGN PATENT DOCUMENTS

| DE | 102009026467 A1 | 12/2010 |
|---|---|---|
| WO | 2005073524 A1 | 8/2005 |
| WO | 2012089290 A1 | 7/2012 |

OTHER PUBLICATIONS

Search report from corresponding FR 1358347.

* cited by examiner

*Primary Examiner* — Walter D. Griffin
*Assistant Examiner* — Jelitza M Perez
(74) *Attorney, Agent, or Firm* — Carlson, Gaskey & Olds, P.C.

(57) ABSTRACT

This exhaust gas purification device (2, 102), comprising an upstream pipe (4), in which a first exhaust gas purification member (6) is housed, a downstream pipe (8) in which a second exhaust gas purification member (10) is housed, a mixing chamber (12) and an injection device (20) for a nitrogen oxide reducing product;
is characterized in that the mixing chamber includes a first deflector member capable of channeling the flow of exhaust gas such that it flows through the jet of nitrogen oxide reducing product substantially perpendicular to the second deflector member (36, 56), the second deflector member being configured to form two swirling flows of a mixture of exhaust gas and nitrogen oxide reducing product;
and in that the device further includes an element (54, 58) for protecting the second member (10) for purifying exhaust gas.

27 Claims, 6 Drawing Sheets

DEVICE FOR PURIFYING THE EXHAUST GAS OF AN INTERNAL COMBUSTION ENGINE

RELATED APPLICATION

This is the U.S. national phase of PCT/EP2014/068449, filed Aug. 29, 2014, which claimed priority to FR 13 588347, filed Aug. 30, 2013.

TECHNICAL FIELD

The present invention relates to a device for purifying the exhaust gas of an internal combustion engine, for example of a motor vehicle.

In particular, according to a first aspect, the present invention relates to a device for purifying exhaust gas, comprising: an upstream pipe in which is housed a first member for purifying exhaust gas; a downstream pipe in which is housed a second member for purifying exhaust gas; a mixing chamber comprising a lateral wall defining an exhaust gas inlet communicating with the upstream pipe and an exhaust gas outlet communicating with the downstream pipe; and an injection device able to inject, in the mixing chamber, at least one jet of a nitrogen oxide reducing product in an injection direction.

BACKGROUND

Such an exhaust gas purifying device is in particular known from U.S. Pat. No. 8,371,114. Such a device is provided to equip an internal combustion engine, for example a diesel engine. It includes a catalyst provided to reduce the nitrogen oxides present in the exhaust gas and an injector placed upstream from the catalyst. The injector is designed to inject a reagent, in particular a reducer or a substance producing a nitrogen oxide reducer, such as urea. The urea undergoes two consecutive chemical reactions, thermolysis and hydrolysis, and turns into ammonia. Within the catalyst, and when the exhaust gases reach a certain temperature, the ammonia reacts chemically with the nitrogen oxides, reducing them into nitrogen and water.

However, this type of device does not make it possible to obtain a sufficient conversion effectiveness of the nitrogen oxides. Indeed, in this type of device, the exhaust gas flow only has a small distance to mix with the urea before reaching the catalyst, which does not allow good homogenization of the mixture.

In this context, the invention aims to propose a device for purifying exhaust gas having a high conversion effectiveness for the nitrogen oxides.

SUMMARY

To that end, the invention relates to an exhaust gas purification of the aforementioned type, wherein the mixing chamber includes a first deflector member and a second deflector member. The first deflector member is capable of channeling the flow of exhaust gas such that it flows through the jet of nitrogen oxide reducing product in a deflected direction forming, with the injection direction, an angle close to 90°, and then substantially perpendicular to the second deflector member. The second deflector member is configured to form two swirling flows of a mixture of exhaust gas and nitrogen oxide reducing product on either side of the jet of nitrogen oxide reducing product. The device further includes a protection element that protects the second exhaust gas purification member. The protection element extends in front of the jet of nitrogen oxide reducing product.

The exhaust gas purification device according to the invention may further include one or more of the following features:

- the jet of nitrogen oxide reducing product is positioned downstream from the first deflector member and upstream from the second deflector member;
- the mixing chamber includes two volumes situated across from the second deflector member, on either side of the first deflector member, the two volumes being able to receive the two swirling flows of the mixture of exhaust gas and nitrogen oxide reducing product;
- the mixing chamber includes an upstream part in which the inlet emerges, the flow of exhaust gas flowing along the upstream part in an upstream direction, the first deflector member being arranged so that the deflected direction forms an angle comprised between 45° and 135° with the upstream direction;
- the injection direction is substantially parallel to the upstream direction;
- the protection element is formed by the first deflector member;
- the protection element comprises a plate having a half moon shape;
- the plate further includes two protruding tabs extending from a circumference of the plate;
- the second deflector member is formed by the lateral wall of the mixing volume;
- the second deflector member is formed by a second deflector wall positioned between the jet of nitrogen oxide reducing product and the lateral wall, downstream from the jet of nitrogen oxide reducing product;
- the second deflector wall has a wavy shape having a central portion protruding toward the jet of nitrogen oxide reducing product and two recessed portions situated on either side of the central portion;
- the first deflector member is arranged to deflect the flow of exhaust gas toward the central portion of the second deflector wall;
- the jet of nitrogen oxide reducing product flows substantially parallel to the second deflector member;
- the first exhaust gas purification member comprises an oxidation catalyst and the second exhaust gas purification member comprises a catalyst for selective reduction of the nitrogen oxides and/or a catalyst for selective reduction of the nitrogen oxides with filter;
- the two swirling flows are separated from one another and have respective axes of rotation parallel to one another and separated from one another;
- the second deflector member is placed in the extension of the exhaust gas flow in the deflected direction;
- the protection element is situated downstream from the second deflector member;
- the first deflector member, the second deflector member and the protection element are arranged to form a U-shaped flow path for the exhaust gases around the first deflector member;
- the second deflector member forms the bottom of the U-shaped flow path; and
- the protection element is a plate substantially parallel to the deflected direction.

According to a second aspect, the invention relates to an exhaust line comprising a purification device having the above features.

BRIEF DESCRIPTION OF THE DRAWINGS

The invention will be better understood upon reading the following description, provided solely as an example and done in reference to the appended drawings, in which.

DETAILED DESCRIPTION

In the following description, the upstream and downstream directions will be understood relative to the normal flow direction of the exhaust gases through the exhaust line, indicated by the arrows F in the figures.

The main flow direction of the exhaust gas flow will be understood as being the direction of the exhaust gas flow flowing from upstream to downstream, along the arrows F shown in the figures.

Figure 1:
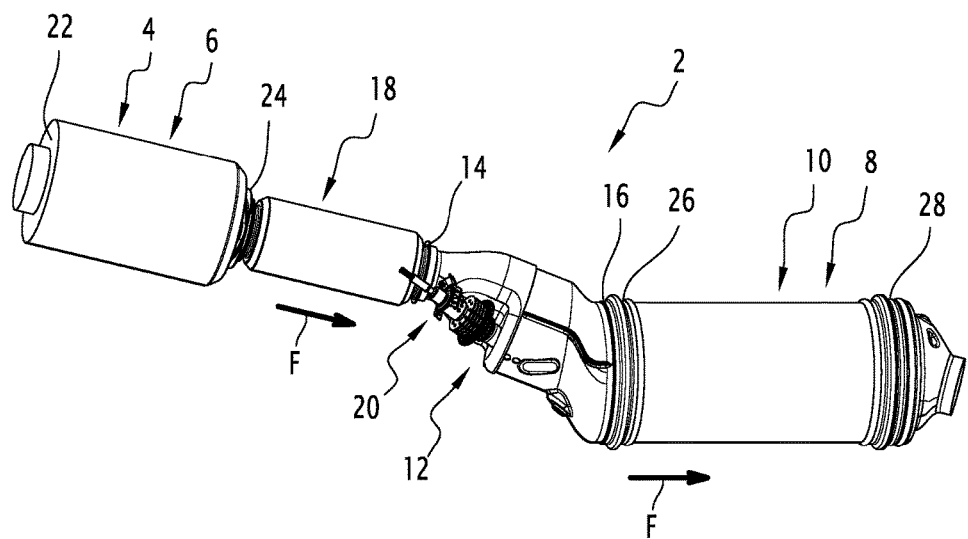
FIG. 1 is a perspective view of an exhaust gas purifying device according to the invention.

FIG. 1 shows a device 2 for purifying exhaust gases coming from an internal combustion engine, for example a motor vehicle engine. For example, the device 2 is designed to purify exhaust gases from a diesel engine.

The purification device 2 includes an upstream pipe 4, in which a first exhaust gas purification member 6 is housed, a downstream pipe 8 in which a second exhaust gas purification member 10 is housed, and a mixing chamber 12 comprising an exhaust gas inlet 14 communicating with the upstream pipe 4 and an exhaust gas outlet 16 communicating with the downstream pipe 8.

As shown in FIG. 1, the device 2 further includes a mechanical decoupling or separator element 18 positioned between the upstream pipe 4 and the mixing chamber 12. Alternatively, the device 2 does not comprise a mechanical decoupling element.

The purification device 2 further includes an injection device 20, suitable for injecting, in the mixing chamber 12, at least one jet of nitrogen oxide reducing product, for example a jet of urea.

The upstream pipe 4 is connected toward the upstream to an exhaust collector (not shown) that collects the exhaust gases leaving the combustion chambers of the internal combustion engine.

The first purification member 6 is a first oxidation catalyst for diesel engine (DOC). It is arranged inside the upstream pipe 4 such that the exhaust gas flowing from the exhaust collector to the inlet of the mechanical decoupling element 18 passes through this first catalyst 6.

This first oxidation catalyst 6 has an inlet face 22 by which the exhaust gases enter the first catalyst 6, and an outlet face 24 by which the exhaust gases leave the first catalyst 6.

The outlet face 24 substantially coincides with the inlet of the mechanical decoupling element 18. The upstream pipe 4 emerges directly in the inlet of the mechanical decoupling element 18.

The second purification member 10 is a second catalyst. It is for example formed by a nitrogen oxide selective catalytic reduction (SCR) catalyst, and/or a nitrogen oxide selective catalytic reduction on filter (SCRF) catalyst. The second catalyst 10 is arranged in the downstream part 8 such that the exhaust gases leaving through the outlet 16 of the mixing chamber 12 pass through the second catalyst 10.

The second catalyst 10 has an inlet face 26, by which the exhaust gases penetrate inside the second catalyst 10. This inlet face 26 coincides with the outlet 16 of the mixing chamber 12.

Furthermore, the second catalyst 10 comprises an outlet face 28 through which the exhaust gases flow to subsequently be released into the atmosphere after purification.

The injection device 20 is capable of injecting a reagent inside the mixing chamber 12 in an injection direction, in the form of one or more jets. The reagent is typically a liquid solution of a nitrogen oxide reducing product or a substance producing such a reducer. The reducer can be one or more hydrocarbons, partially oxidized hydrocarbon species, ammonia or a compound generating ammonia by chemical decomposition. The reagent can also be in gas form, such as gaseous ammonia. Preferably, the injection device 20 is provided to inject a mixture of water and urea in the form of droplets inside the mixing chamber 12.

The injection device 20 also includes a supply line of the injection device 20 that supplies liquid to be injected (not shown), and a control (not shown) that allows or prevents the supply of the injection device 20 by the supply line. The control is, for example, a valve controlled by a computer.

As for example shown in FIG. 1, the injection device 20 is positioned such that the urea jet flows substantially parallel to the main flow direction of the exhaust gas flow. Alternatively, the urea jet is inclined relative to the main flow direction of the exhaust gases.

Figure 2:
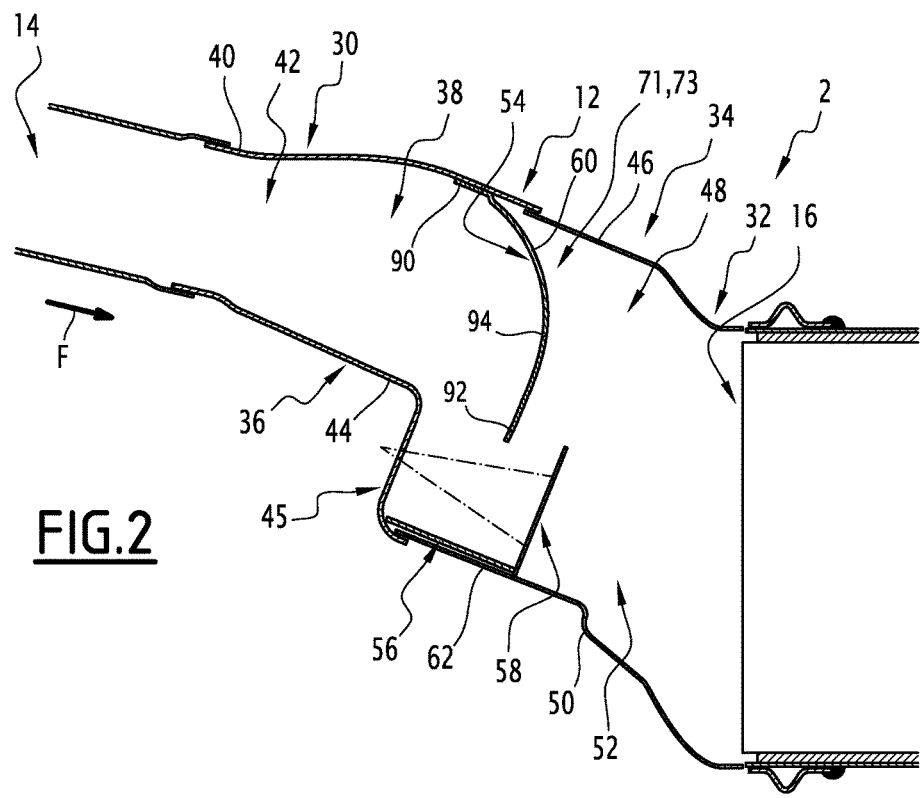
FIG. 2 is a partial diagrammatic illustration of the exhaust gas purification device according to the invention.
Figure 3:
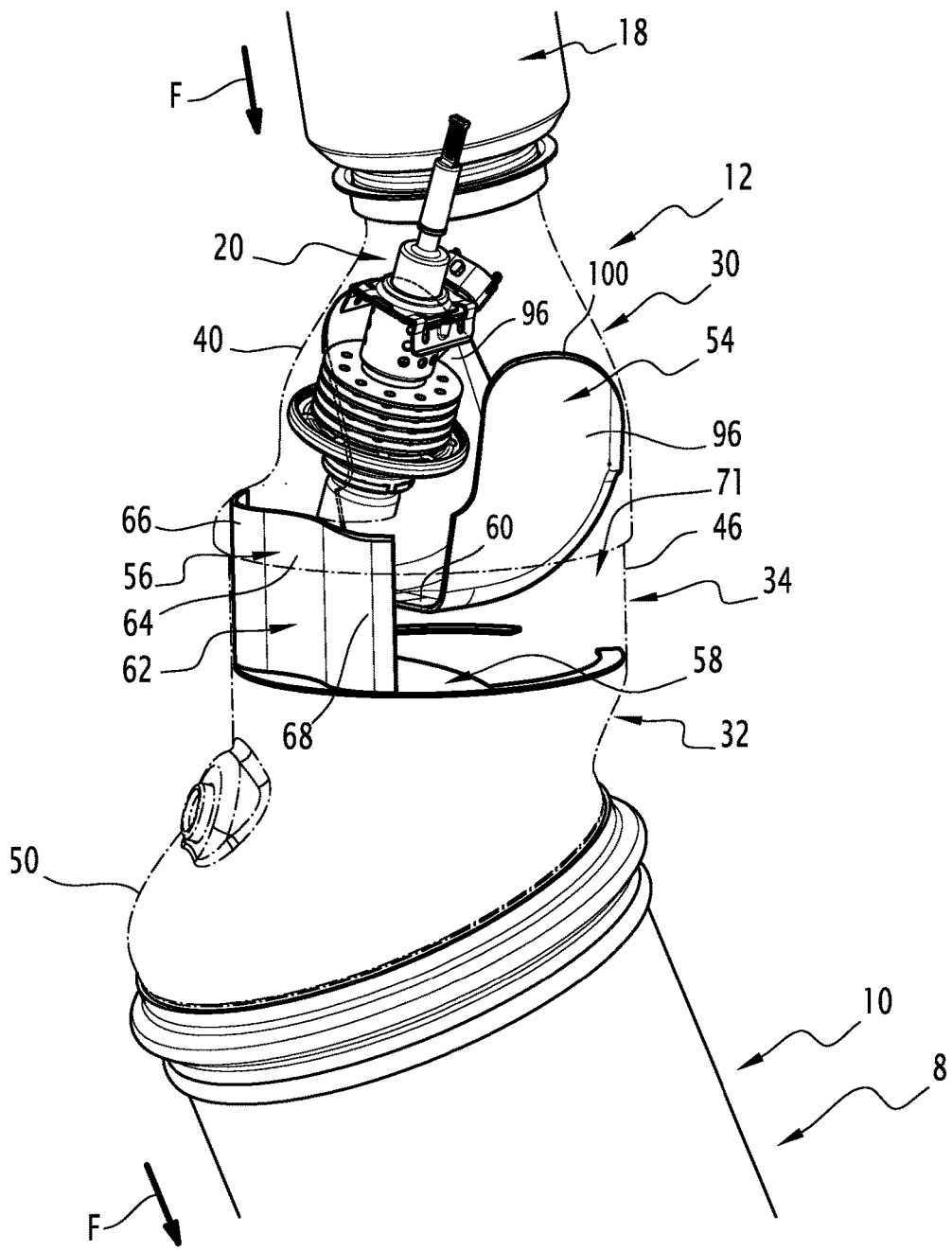
FIGS. 3 and 4 are partial perspective views of the exhaust gas purification device according to the invention.
Figure 4:
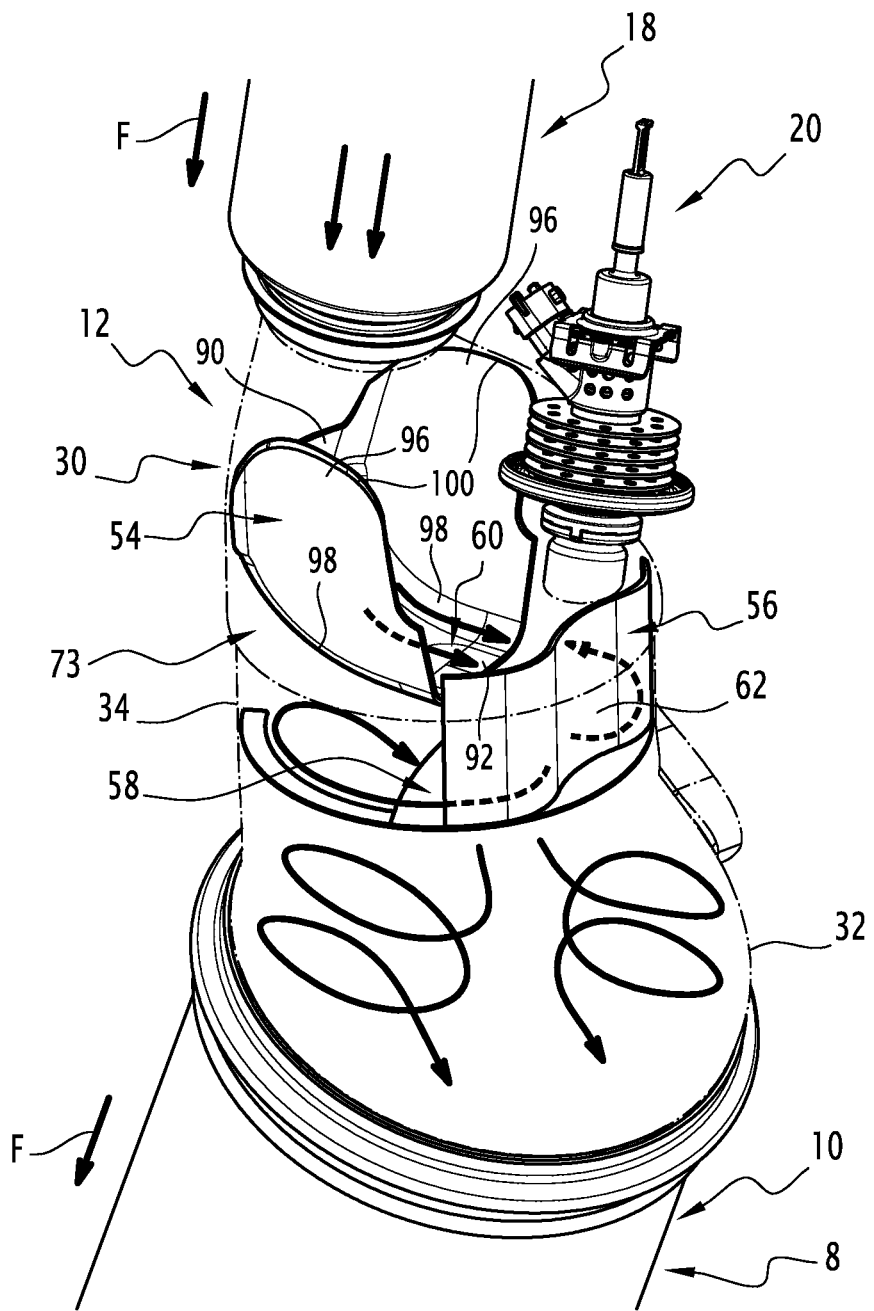

As shown in FIGS. 2 to 4, the mixing chamber 12 includes an upstream part 30 communicating with the separator element 18, a downstream part 32 beginning with the second catalyst 10, and an intermediate part 34 positioned between the upstream part 30 and the downstream part 32.

The mixing chamber 12 includes a lateral wall 36 with a generally rounded shape defining a flow channel 38 for the exhaust gases.

The upstream part 30 has a section normal to the flow increasing from upstream to downstream, and an upstream lateral wall 40 defining an upstream flow channel 42 for the exhaust gases. The upstream part 30, for example, has a generally conical shape.

Alternatively, the upstream part 30 has a section normal to the flow that is constant or decreases from upstream to downstream.

The upstream lateral wall 40 has a flat portion 44 designed to allow the housing of the injection device 20. In particular, the upstream lateral wall 40 has a portion 45 extending transversely, preferably perpendicular, to the extension direction of the upstream part 30, offset radially relative to the axis of the upstream part 30, and on which the injection device 20 is mounted.

The intermediate part 34 has a generally cylindrical shape and a section normal to the flow substantially constant from upstream to downstream. The intermediate part 34 comprises an intermediate lateral wall 46 defining an intermediate flow channel 48 for the exhaust gases communicating upstream with the upstream flow channel 42 defined by the upstream part 30.

The downstream part 32 has a section normal to the flow increasing from the intermediate part 34 toward the second catalyst 10. Alternatively, the downstream part 32 has a section normal to the flow that is constant or decreases from upstream to downstream.

The downstream part 32 comprises a downstream lateral wall 50 defining a channel 52 for the downstream flow of the exhaust gases communicating with the intermediate channel 48 and the upstream channel 42.

The mixing chamber 12 further comprises a first deflector member 54 and a second deflector member 56.

In the example shown in FIGS. 2 to 4, the jet of nitrogen oxide reducing product is positioned, in the mixing chamber 12, downstream from the first deflector member 54 and upstream from the second deflector member 56.

In general, the jet of nitrogen oxide reducing product is able to be arranged so as to spray any surface among the first deflector member 54, the second deflector member 56, and a protection element or plate 58.

The first deflector member 54 is able to channel the flow of exhaust gases flowing from the upstream part 30 such that it flows through the jet of nitrogen oxide reducing product in a deflected direction forming, with the injection direction, an angle close to 90°, then substantially perpendicular to the second deflector member 56.

An angle close to 90° here refers to an angle comprised between 70° and 110°.

The fact that the exhaust gases cross through the jet of nitrogen oxide reducing product in a direction substantially perpendicular to that jet favors the mixing of the reducing product and the gas.

The first deflector member 54 favors the deflection and channeling of the flow of exhaust gas toward the second deflector member 56. Advantageously, the first deflector member 54 allows a gentle transition of the exhaust gases from the upstream part 30 toward the second deflector member 56.

The flow of exhaust gas flows along the upstream part 30 in an upstream direction, the first deflector member 54 being arranged so that the deflected direction forms an angle comprised between 45° and 135° with the upstream direction, preferably comprised between 60° and 120° and still more preferably between 80° and 110°.

The injection direction is substantially parallel to the upstream direction, i.e., comprised between −30° and +30°, preferably between −15° and +15°.

This arrangement contributes to reducing the bulk of the mixing volume, and more generally of the exhaust gas purifying device.

The angle formed by the second deflector member 56 and the exhaust gas flow deflected by the first deflector member 54 is for example comprised between 45° and 135°, and in particular comprised between 75° and 105°.

Thus, the second deflector member 56 extends transversely, i.e., substantially perpendicularly, to the deflected direction, i.e., the flow direction of the exhaust gas flow deflected by the first deflector member 54.

This means that the direction normal to the second deflector member 56 is substantially parallel to the deflected direction. The normal direction is considered perpendicular to a mean plane, said mean plane being the plane such that the sum of the distances of the points of the second deflector member 56 at the mean plane is minimal.

The second deflector member 56 is configured to form two swirling flows of the mixture of exhaust gases and nitrogen oxide reducing product, on either side of the jet of nitrogen oxide reducing product.

Separating the exhaust gas flow into two swirling flows, immediately downstream from the injection point of the nitrogen oxide reducer, considerably favors the mixing of the exhaust gases and nitrogen oxide reducing product.

Furthermore, the fact that the exhaust gas flows in a deflected direction substantially perpendicular to the second deflector member is important for the proper formation of the swirling flows.

Furthermore, the nitrogen oxide reducing product is injected exactly at the middle, i.e., between the two swirling flows. This allows even filling of the two swirling flows with nitrogen oxide reducing product, i.e., with the same quantity of reducing product.

The two swirling flows are separated from one another, i.e., distant from one another. They have respective axes of rotation parallel to one another and separate from one another, as illustrated in FIG. 4.

The first deflector member 54 is positioned in the upstream part 30, and extends partially in the intermediate part 34 (FIG. 2).

The first deflector member 54 comprises a first deflector wall 60 having a concave shape, the concave side being turned toward the upstream pipe 4 of the device 2. The first deflector wall 60, for example, is in the shape of a baseball glove.

The first deflector wall 60 comprises an upstream end zone 90 that is substantially parallel to the upstream direction, a downstream end zone 92 substantially parallel to the deflected direction, and a bowed intermediate zone 94 connecting the upstream and downstream zones 90, 92 to one another. The downstream end zone 92 is housed in the intermediate part 34.

The first deflector member 54 also includes two lateral ears 96 (FIGS. 3 and 4), connected to the two opposite lateral edges 98 of the first deflector wall 60. They are adjacent to the first deflector wall 60 over its entire length and are thus connected to the upstream end zone 90, the downstream end zone 92, and the intermediate zone 94. They are each oriented generally substantially perpendicularly to the deflector wall 60. Each ear 96 is defined by a free edge 100, connecting to the corresponding lateral edge 98.

The lateral ears 96 are positioned across from one another. They are slightly inclined relative to one another. More specifically, they move away from one another from the lateral edges 98 to the free edges 100. Two free volumes are thus created between the ears 96 and the intermediate lateral wall 46, allowing the swirling flows to develop, as explained later.

The second deflector member 56 is positioned in the intermediate part 34 of the mixing chamber 12, and extends partially in the upstream part 30.

The second deflector member 56 is placed in the extension of the exhaust gas flow in the deflected direction. It is placed immediately downstream from the jet of nitrogen oxide reducing product.

In the example illustrated in FIGS. 2 to 4, the second deflector member 56 is formed by a second deflector wall 62 positioned between the urea jet and the lateral wall 36, downstream from the urea jet.

The second deflector wall 62 is positioned such that the urea jet flows substantially parallel to the second deflector wall 62. Alternatively, the urea jet is inclined relative to the second deflector wall 62, such that it sprays the second deflector wall 62.

The second deflector wall 62 extends transversely, for example perpendicularly, to the flow direction of the exhaust gas flow deflected by the first deflector member 54.

The second deflector wall 62 is able to form two swirling flows of a mixture of exhaust gas and nitrogen oxide reducing product.

Figure 5:
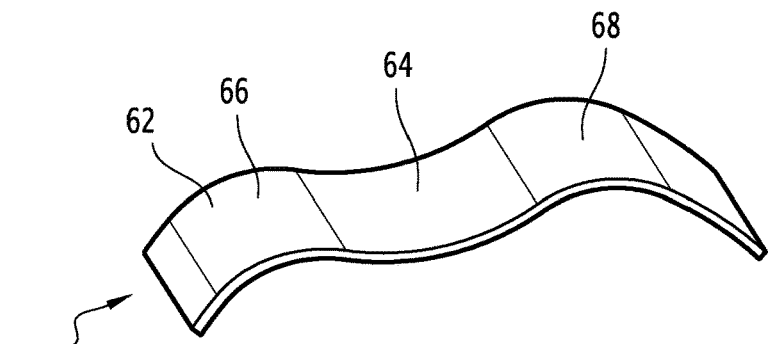
FIG. 5 is a perspective view of a second deflector member of the purification device according to a first embodiment.
Figure 6:
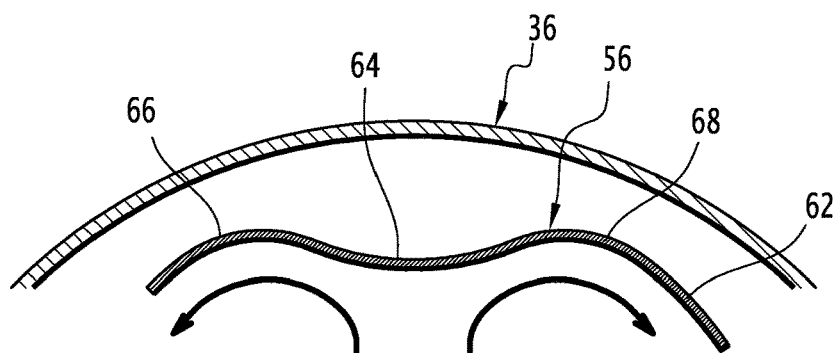
FIG. 6 is a diagrammatic illustration of the second deflector member of FIG. 5 placed in the purification device according to the invention

As shown in FIGS. 5 and 6, the second deflector wall 62, preferably to that end, has a wavy shape having a central portion 64 protruding toward the urea jet and two recessed lateral portions 66, 68 situated on either side of the protruding central portion 64.

Advantageously, the first deflector member 54 is arranged to deflect the exhaust gas flow toward the central portion 64 of the second deflector wall 62. In this way, the flows formed after passage of the exhaust gases in the urea jet are evenly filled with nitrogen oxide reducing product. Such a configuration further makes it possible to generate two swirling flows more effectively.

Advantageously, the urea jet flows substantially parallel to and across from the central portion 64.

Figure 7:
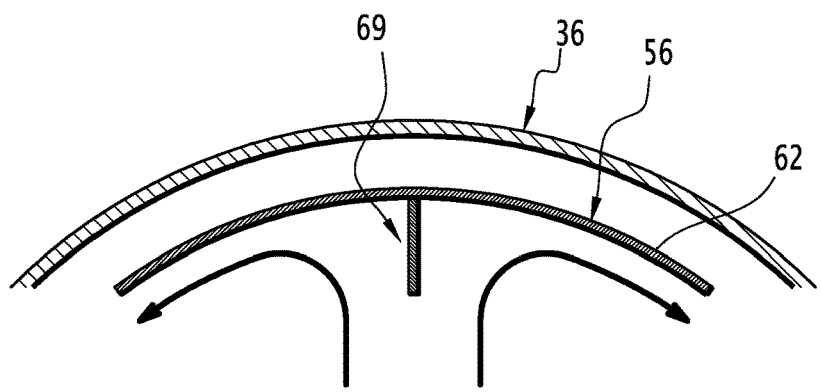
FIG. 7 is a diagrammatic illustration of a second deflector member placed in the purification device, according to a second embodiment.
Figure 8:
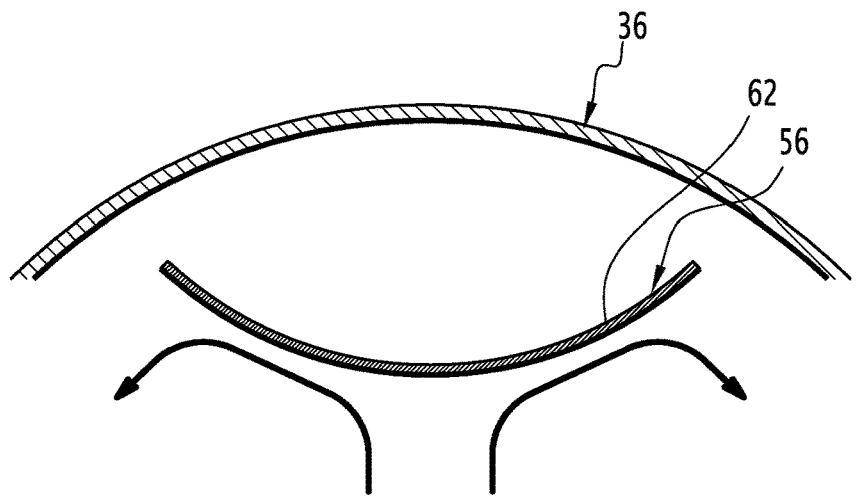
FIG. 8 is a diagrammatic illustration of a second deflector member placed in the purification device, according to a third embodiment.

Alternatively, and as shown in FIG. 7, the second deflector wall 62 has a concave shape, the concave side of which is oriented toward the urea jet. In still another alternative, shown in FIG. 8, the second deflector wall 62 has a convex shape whereof the convex side is oriented toward the urea jet.

According to a second embodiment (not shown), the second deflector member 56 is formed by the lateral wall 36 of the mixing chamber 12, more specifically by the intermediate lateral wall 46 of the intermediate part 34.

In the example shown in FIG. 7, the second deflector member 56 further comprises a separating part 69 attached on the second deflector member 56.

The separating part 69 is, for example, a plate attached on the median region of the second deflector wall 62, perpendicular thereto such that it protrudes from the second deflector wall 62 toward the urea jet.

The separating part 69 is, for example, fixed by welding on the second deflector wall 62.

The separating part 69 makes it possible on the one hand to facilitate the formation of the two swirling flows of the mixture of exhaust gas and nitrogen oxide reducing product. On the other hand, it makes it possible to separate the urea jet in two and thus facilitates the mixing between the nitrogen oxide reducing product and the two swirling flows.

The mixing chamber 12 further comprises a protection element of the second catalyst 10. This element is provided to prevent the jet of nitrogen oxide reducing product from directly impacting the second purification member. Preferably, it also serves as an impactor when the reducing product is in liquid form, and contributes to exploding the drops of reducing product into much smaller droplets.

The protection element 58 is arranged to intercept the jet of nitrogen oxide reducing product. More specifically, the protection element 58 is placed facing, i.e., in front of the jet of reducing product in the injection direction.

The protection element 58 is placed downstream from the second deflector member 56, preferably immediately downstream.

The protection element 58 is, for example, formed by a protection plate 58.

As shown in FIGS. 2 to 4, the protection plate 58 extends parallel to the flow direction once the latter is deflected by the first deflector member 54, between the urea jet and the inlet face 26 of the second catalyst 10. It is designed to prevent the urea drops present in the urea jet from directly impacting the inlet face 26 of the second catalyst 10.

It further favors the formation of the two swirling flows and allows better homogenization of the mixture of exhaust gases in the nitrogen oxide reducing product, by increasing the distance traveled by the mixture before reaching the second catalyst 10.

Indeed, the first deflector member 54, the second deflector member 56, and the protection element 58 are arranged to form a U-shaped flow path for the exhaust gases around the first deflector member 54 and more specifically around the downstream end zone 92 and/or around the ears 96.

The second deflector member 56 forms the bottom of the U-shaped flow path, causing switching back of the exhaust gases.

Figure 9:
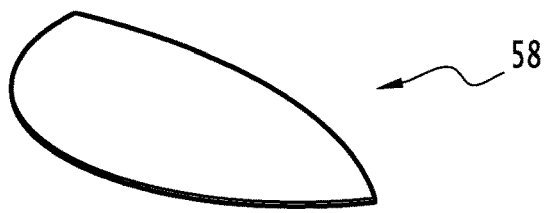
FIG. 9 is a perspective view of a protection element for the second exhaust gas purification member, according to a first embodiment.

As shown in FIG. 9, the protection plate 58 advantageously is in the shape of a half-moon.

Figure 10:
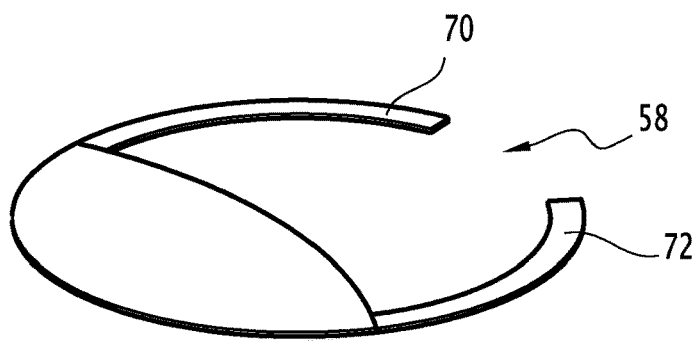
FIG. 10 is a perspective view of a protection element of the second exhaust gas purification member, according to a second embodiment.

Preferably, and as shown in FIG. 10, the protection plate 58 further comprises two protruding parts 70, 72 extending in the extension of the circumference of the protection plate 58. The two protruding parts 70, 72 also make it possible to improve the homogenization of the mixture by further increasing the distance traveled by the mixture before reaching the second catalyst 10.

Alternatively (not shown), the protection element 58 is formed by the first deflector wall 60. More specifically, the protection element 58 is formed by a portion of the first deflector wall 60 extending parallel to the flow direction once the latter is deflected by the first deflector member 54, between the urea jet and the inlet face 26 of the second catalyst 10.

The mixing chamber 12 includes two volumes 71, 73 defined by the lateral wall 36 and the first deflector member 54. More specifically, they are defined between the ears 96 and the intermediate lateral wall 46, as indicated above. Two volumes 71, 73 are situated across from the second deflector member 56 on either side of the first deflector member 54, and are able to receive the two swirling flows of the mixture of exhaust gas and nitrogen oxide reducing product.

The operation of the device 2 for purifying an exhaust gas described above will now be outlined in light of FIG. 4, in which exhaust gas streams are illustrated.

After having crossed the first catalyst 6, the exhaust gases cross through the mechanical decoupling element 18, then reach the upstream part 30 of the mixing chamber 12.

The exhaust gases next reach the first deflector wall 60. The concave shape of the first deflector wall 60 initiates the deflection of the exhaust gases toward the urea jet. In this way, the exhaust gases flow toward the urea jet transversely thereto, i.e., substantially perpendicular thereto.

After having crossed through the urea jet, the exhaust gas flow is oriented toward the second deflector wall 62. More specifically, the exhaust gas flow is oriented toward the protruding central portion 64 of the second deflector wall 62. The protruding central portion 64 then separates the flow into two swirling flows. The two swirling flows respectively impact the two recessed lateral portions 66, 68. The latter next become the two swirling flows on either side of the first deflector member 54 along the lateral wall 36.

The two swirling flows filled with nitrogen oxide reducing product flow parallel to the protection plate 58 comprising the two protruding portions 70, 72, before reaching the second catalyst 10. The protection plate 58 provided with the two protruding portions 70, 72 makes it possible to extend the distance traveled by the mixture before reaching the second catalyst 10.

Figure 11:
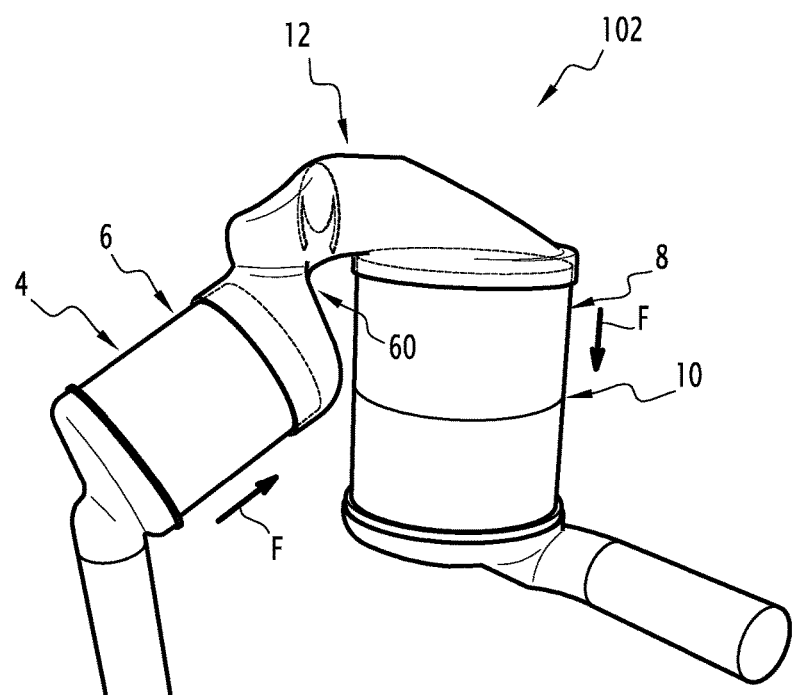
FIG. 11 is a perspective view of an alternative of the exhaust gas purification device according to the invention.
Figure 12:
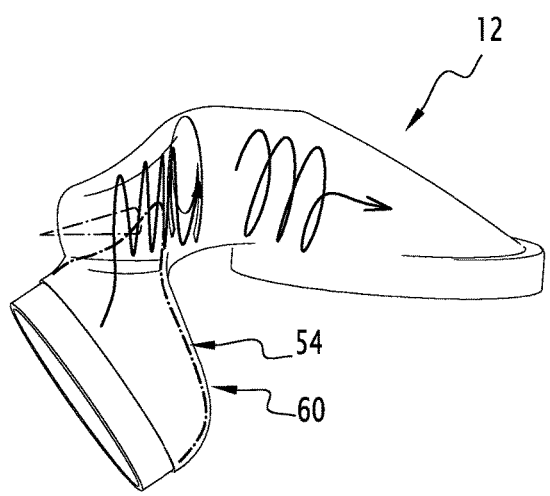
FIGS. 12 and 13 are perspective views of the mixing volume of the exhaust gas purification device of FIG. 11.
Figure 13:
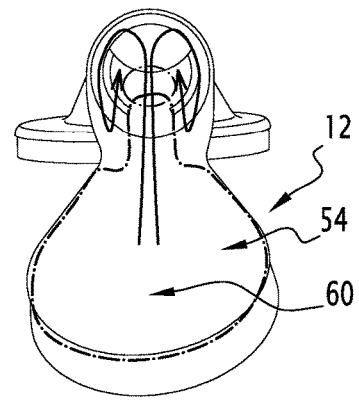

FIGS. 11 to 13 show an alternative 102 of the exhaust gas purifying device according to the invention.

Unlike the purifying device 2 previously described, the purifying device 102 does not include a mechanical decoupling element, and the first purification member 6 is directly connected to the mixing chamber 12.

The outlet face 24 of the first catalyst 6 coincides substantially with the inlet 14 of the mixing chamber 12, and the upstream pipe 4 emerges directly in the mixing chamber 12.

The upstream pipe 4 is further inclined relative to the downstream pipe 8.

Furthermore, the first deflector member 54 is formed by the upstream lateral wall 40 of the upstream part 30 of the mixing chamber 12. The first deflector wall 60 formed in the upstream lateral wall 40 has a concave curved shape whereof the concave side is oriented toward the inside of the mixing chamber 12, for example a top-hat shape.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An exhaust gas purification device comprising:
   an upstream pipe in which is housed a first exhaust gas purification member for purifying exhaust gas;
   a downstream pipe in which is housed a second exhaust gas purification member for purifying exhaust gas;
   a mixing chamber comprising a lateral wall defining an exhaust gas inlet communicating with the upstream pipe and an exhaust gas outlet communicating with the downstream pipe;
   an injection device able to inject, in the mixing chamber, at least one jet of a nitrogen oxide reducing product in an injection direction;
   wherein that the mixing chamber includes a first deflector member and a second deflector member, the first deflector member being capable of channeling the flow of exhaust gas such that exhaust gas flows through the jet of nitrogen oxide reducing product in a deflected direction forming, with the injection direction, an angle close to 90°, then substantially perpendicular to the second deflector member, the second deflector member being configured to form two swirling flows of a mixture of exhaust gas and nitrogen oxide reducing product on either side of the jet of nitrogen oxide reducing product; and
   a protection element that protects the second exhaust gas purification member, the protection element extending in front of the jet of nitrogen oxide reducing product to intercept the at least one jet of a nitrogen oxide reducing product injected along the injection direction.

2. The device according to claim 1, wherein the jet of nitrogen oxide reducing product is positioned downstream from the first deflector member and upstream from the second deflector member.

3. The device according to claim 1, wherein the mixing chamber includes two volumes situated across from the second deflector member, on either side of the first deflector member, the two volumes being able to receive the two swirling flows of the mixture of exhaust gas and nitrogen oxide reducing product.

4. The device according to claim 1, wherein the mixing chamber includes an upstream part in which the inlet emerges, the flow of exhaust gas flowing along the upstream part in an upstream direction, the first deflector member being arranged so that the deflected direction forms an angle comprised between 45° and 135° with the upstream direction.

5. The device according to claim 4, wherein the injection direction is substantially parallel to the upstream direction.

6. The device according to claim 1, wherein the protection element is formed by the first deflector member.

7. The device according to claim 1, wherein the protection element comprises a plate having a half-moon shape.

8. The device according to claim 7, wherein the plate further includes two protruding tabs extending from a circumference of the plate.

9. The device according to claim 1, wherein the second deflector member is formed by the lateral wall of the mixing volume.

10. The device according to claim 1, wherein the second deflector member is formed by a second deflector wall positioned between the jet of nitrogen oxide reducing product and the lateral wall, downstream from the jet of nitrogen oxide reducing product.

11. The device according to claim 10, wherein the second deflector wall has a wavy shape having a central portion protruding toward the jet of nitrogen oxide reducing product and two recessed portions situated on either side of the central portion.

12. The device according to claim 11, wherein the first deflector member is arranged to deflect the flow of exhaust gas toward the central portion of the second deflector wall.

13. The device according to claim 1, wherein the jet of nitrogen oxide reducing product flows substantially parallel to the second deflector member.

14. The device according to the claim 1, wherein the first exhaust gas purification member comprises an oxidation catalyst and in that the second exhaust gas purification member comprises a catalyst for selective reduction of the nitrogen oxides and/or a catalyst for selective reduction of the nitrogen oxides with filter.

15. The device according to the claim 1, wherein the two swirling flows are separated from one another and have respective axes of rotation parallel to one another and separated from one another.

16. The device according to the claim 1, wherein the second deflector member is placed in an extension of the exhaust gas flow in the deflected direction.

17. The device according to the claim 1, wherein the protection element is situated downstream from the second deflector member.

18. The device according to claim 1, wherein the first deflector member, the second deflector member, and the protection element are arranged to form a U-shaped flow path for the exhaust gases around the first deflector member.

19. The device according to claim 18, wherein the second deflector member forms a bottom of the U-shaped flow path.

20. The device according to claim 1, wherein the protection element is a plate substantially parallel to the deflected direction.

21. The device according to claim 1, wherein the protection element is positioned between the injection device and the second deflector member along the injection direction such that the protection element provides an injection surface facing the injection device and configured to intercept the nitrogen oxide reducing product.

22. The device according to claim 1, wherein the second deflector member comprises a surface that receives flow deflected by the first deflector member and which is configured to form a first swirling flow of a mixture of exhaust gases and nitrogen oxide reducing product on one side of the jet and a second swirling flow of the mixture of exhaust gases and nitrogen oxide reducing product on another side of the jet.

23. The device according to claim 22, wherein the surface of the second deflector member is formed by a wall having a wavy shape with a central portion protruding toward the injection device and two recessed lateral portions situated on either side of the central portion.

24. The device according to claim 22, wherein the surface of the second deflector member is formed by a wall having a convex or concave shape.

25. The device according to claim 24, wherein the surface of the second deflector member is formed by a wall having the concave shape, and wherein the concave shape faces the jet.

26. The device according to claim 25, including a separating member fixed to the second deflector member to facilitate formation of the first and second swirling flows.

27. The device according to claim 24, wherein the surface of the second deflector member is formed by a wall having the convex shape, and wherein the convex shape faces the jet.

\* \* \* \* \*